(12) United States Patent
Chou et al.

(10) Patent No.: US 10,054,789 B2
(45) Date of Patent: *Aug. 21, 2018

(54) OPTICAL LENS MODULE WITH PLASTIC BARREL, IMAGING APPARATUS INCLUDING SAME MODULE AND ELECTRONIC DEVICE INCLUDING SAME APPARATUS

(71) Applicant: LARGAN PRECISION CO., LTD., Taichung (TW)

(72) Inventors: Ming-Ta Chou, Taichung (TW); Cheng-Feng Lin, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/429,479

(22) Filed: Feb. 10, 2017

(65) Prior Publication Data
US 2017/0153447 A1 Jun. 1, 2017

Related U.S. Application Data

(63) Continuation of application No. 14/851,773, filed on Sep. 11, 2015, now Pat. No. 9,612,437.

(51) Int. Cl.
*G02B 27/00* (2006.01)
*G02B 5/20* (2006.01)
*G02B 13/00* (2006.01)

(52) U.S. Cl.
CPC ......... *G02B 27/0018* (2013.01); *G02B 5/208* (2013.01); *G02B 13/001* (2013.01)

(58) Field of Classification Search
CPC ........ G02B 5/02; G02B 5/0205; G02B 5/021; G02B 5/0221; G02B 5/0268; G02B 5/0284; G02B 7/02; G02B 7/021; G02B 7/022; G02B 7/023; G02B 7/026; G02B 13/001; G02B 13/0015; G02B 27/0018
USPC ....... 359/599, 601, 613, 614, 362, 363, 811, 359/819, 821, 822, 823, 827, 829, 830
See application file for complete search history.

(56) References Cited

U.S. PATENT DOCUMENTS

| | | | |
|---|---|---|---|
| 7,969,666 B2 | 6/2011 | Chen | |
| 8,300,324 B2 | 10/2012 | Hirabayashi | |
| 8,390,945 B2 | 3/2013 | Yen | |
| 9,612,437 B1* | 4/2017 | Chou | G02B 27/0018 |
| 2006/0018041 A1 | 1/2006 | Hirata | |

(Continued)

*Primary Examiner* — Arnel C Lavarias
(74) *Attorney, Agent, or Firm* — McClure, Qualey & Rodack, LLP

(57) ABSTRACT

An optical lens module includes a lens assembly and a plastic barrel. The lens assembly includes a plurality of lens elements and is disposed in the plastic barrel. The plastic barrel includes an object-end portion, an image-end portion, an outer tube portion, an inner tube portion and at least one reflection reduction area. The image-end portion includes an image-end opening. The inner tube portion includes a plurality of parallel inner surfaces and a plurality of inclined inner surfaces, wherein the parallel inner surfaces are parallel to the central axis, and each of the inclined inner surfaces has an angle with the central axis. The reflection reduction area is disposed on one of the inclined inner surfaces closest to the image-end opening, wherein the reflection reduction area and the plastic barrel are integrally formed by an injection molding method.

15 Claims, 19 Drawing Sheets

(56) References Cited

U.S. PATENT DOCUMENTS

2017/0075109 A1* 3/2017 Chou ................. G02B 27/0018
2017/0153447 A1* 6/2017 Chou ................. G02B 27/0018

* cited by examiner

OPTICAL LENS MODULE WITH PLASTIC BARREL, IMAGING APPARATUS INCLUDING SAME MODULE AND ELECTRONIC DEVICE INCLUDING SAME APPARATUS

RELATED APPLICATIONS

The present application is a continuation of the application Ser. No. 14/851,773, filed Sep. 11, 2015, now U.S. Pat. No. 9,612,437, which is herein incorporated by reference.

BACKGROUND

Technical Field

The present disclosure relates to an optical lens module and an imaging apparatus. More particularly, the present disclosure relates to an optical lens module and an imaging apparatus which is applicable to portable electronic devices.

Description of Related Art

Due to the popularity of personal electronic products and mobile communication products having camera functionalities, such as smart phones and tablet personal computers, the demand for compact imaging apparatuses has been increasing, and the requirements for high resolution and image quality of present compact imaging apparatuses increase significantly.

With the trends of the high-pixels camera functionalities of personal electronic products and mobile communication products, the dimension of the imaging apparatus has been increasing such as the diameter of the lens element closest to the image surface of the imaging apparatus reaching 6 mm. On the other hand, the back focal length of the imaging apparatus is still kept short. Hence, more and more non-imaging light is reflected from the surface of the IR-cut filter (infrared-cut filter) to the surfaces of the lens elements, as well as the incident angles on the surfaces of the lens elements are usually greater than the critical angle of the total reflection thereof, so that the reflection from the surfaces of the lens elements to the image surface of the imaging apparatus has been increased, and it results in the ghost image on the image surface of the imaging apparatus.

FIG. 1 is a schematic view of a conventional imaging apparatus 9000. According to the conventional imaging apparatus 9000, the non-imaging light Lia would be reflected from the object-side surface 9601 of the IR-cut filter 9600 to the inner wall 9521 of the plastic barrel 9520, and would be reflected from the inner wall 9521 of the plastic barrel 9520 to the object-side surface 9511 of the lens element 9510 as the non-imaging light Loa, wherein the non-imaging light Loa is attenuated little from the non-imaging light Lia, so that the strength of the non-imaging light Loa is still approach to the strength of the non-imaging light Lia.

As well as the incident angle θ on the object-side surface 9511 of the lens element 9510 is greater than the critical angle $\theta_c$ of the total reflection thereof, so that the reflection from the object-side surface 9511 of the lens element 9510 to the image surface 9700 of the conventional imaging apparatus 9000 results in the ghost image on the image surface 9700 of the conventional imaging apparatus 9000.

If the index of refraction of the lens element 9510 in d-line reference wavelength (587.6 nm) is 1.535, then the critical angle $\theta_c$ of the total reflection of the lens element 9510 is 40.65 degrees as the following:

$$\theta_c = \sin^{-1}\left(\frac{N_{air}}{N_{lens}}\right) = \sin^{-1}\left(\frac{1}{1.535}\right) = 40.65 \text{ degrees.}$$

Herein, $N_{air}$ is the index of refraction of air, which is 1 by assumption, $N_{lens}$ is the index of refraction of the lens element 9510. Furthermore, with the greater diameter of the lens element 9510, more non-imaging light with incident angle above 40.65 degrees has been reflected.

Another instance, if the index of refraction of the lens element in d-line reference wavelength (587.6 nm) is 1.544, then the critical angle $\theta_c$ of the total reflection of the lens element is 40.37 degrees as the following:

$$\theta_c = \sin^{-1}\left(\frac{N_{air}}{N_{lens}}\right) = \sin^{-1}\left(\frac{1}{1.544}\right) = 40.37 \text{ degrees.}$$

However, the aforementioned problems are difficult to solve by the conventional coating of the lens elements. Therefore, the conventional coating cannot satisfy the requirements of reducing the reflection resulting in the ghost image on the image surface of the imaging apparatus.

In view of the above, how to reduce the total reflection of non-imaging light resulting in the ghost image on the image surface for enhancing the image quality of compact imaging apparatuses has become one of the important subjects.

SUMMARY

According to one aspect of the present disclosure, an optical lens module includes a lens assembly and a plastic barrel. The lens assembly includes a plurality of lens elements and is disposed in the plastic barrel. The plastic barrel includes an object-end portion, an image-end portion, an outer tube portion, an inner tube portion and at least one reflection reduction area. The object-end portion includes an object-end surface and an object-end hole. The image-end portion includes an image-end opening. The outer tube portion connects the object-end portion and the image-end portion. The inner tube portion connects the object-end portion and the image-end portion, wherein the inner tube portion is closer to a central axis of the plastic barrel than the outer tube portion. The inner tube portion includes a plurality of parallel inner surfaces and a plurality of inclined inner surfaces, wherein the parallel inner surfaces are parallel to the central axis, and each of the inclined inner surfaces has an angle with the central axis. The reflection reduction area is disposed on one of the inclined inner surfaces closest to the image-end opening, wherein the reflection reduction area and the plastic barrel are integrally formed by an injection molding method.

According to another aspect of the present disclosure, an imaging apparatus includes the optical lens module according to the foregoing aspect, an IR-cut filter and an image sensor. The IR-cut filter is disposed out of the plastic barrel. The image sensor is disposed on an image surface of the optical lens module, and the IR-cut filter is disposed between the plastic barrel and the image sensor.

According to another aspect of the present disclosure, an electronic device includes the imaging apparatus according to the foregoing aspect.

DETAILED DESCRIPTION

1st Embodiment

Figure 2A:
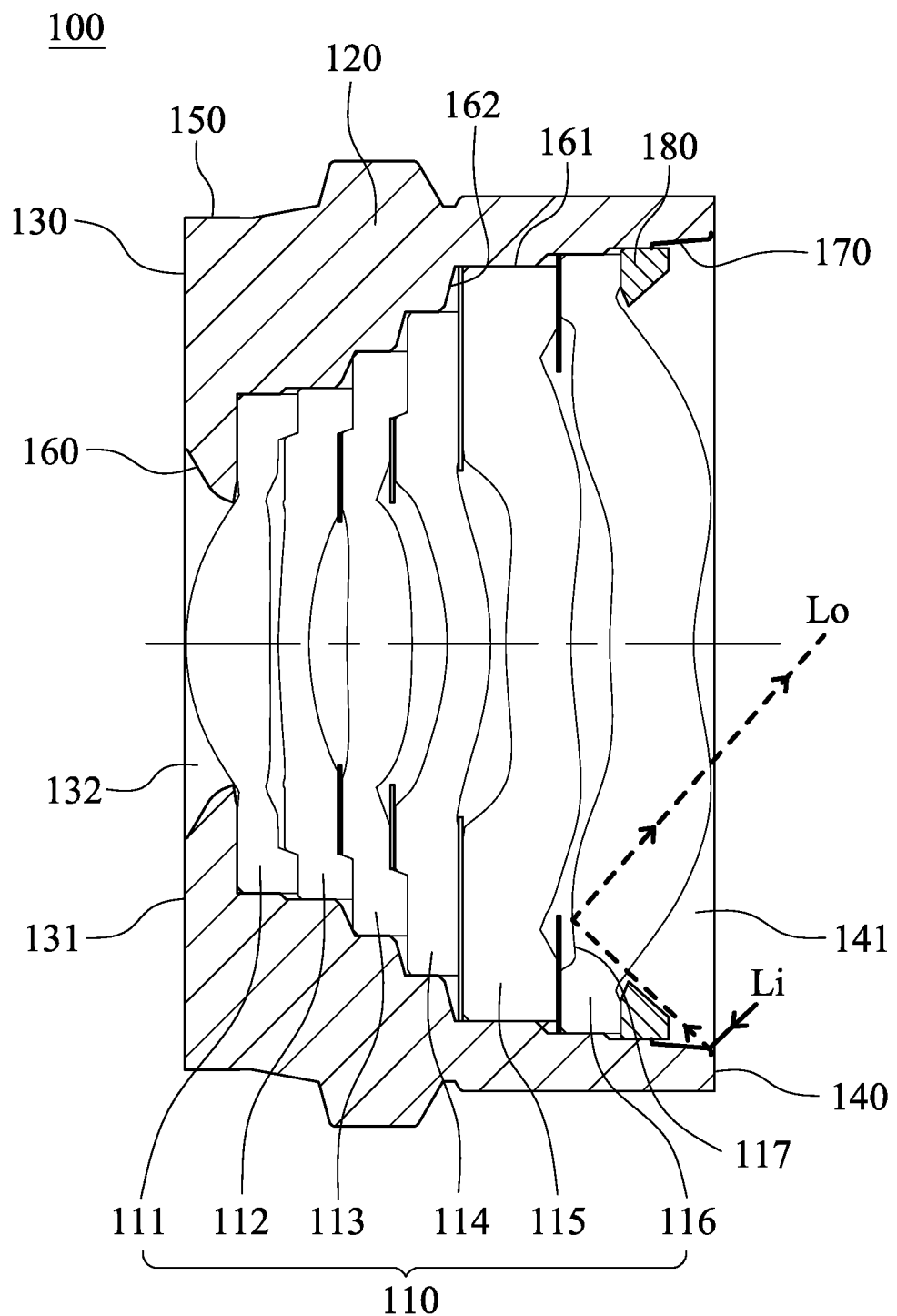
FIG. 2A is a schematic view of an optical lens module according to the 1st embodiment of the present disclosure.

FIG. 2A is a schematic view of an optical lens module 100 according to the 1st embodiment of the present disclosure. In the 1st embodiment, an optical . lens module 100 includes a lens assembly 110 and a plastic barrel 120.

The lens assembly 110 includes a plurality of lens elements (111-116) and is disposed in the plastic barrel 120. The plastic barrel 120 includes an object-end portion 130, an image-end portion 140, an outer tube portion 150, an inner tube portion 160 and at least one reflection reduction area 170. The object-end portion 130 includes an object-end surface 131 and an object-end hole 132. The image-end portion 140 includes an image-end opening 141. The outer tube portion 150 connects the object-end portion 130 and the image-end portion 140. The inner tube portion 160 connects the object-end portion 130 and the image-end portion 140, wherein the inner tube portion 160 is closer to a central axis of the plastic barrel 120 than the outer tube portion 150. The inner tube portion 160 includes a plurality of parallel inner surfaces 161 and a plurality of inclined inner surfaces 162, wherein the parallel inner surfaces 161 are parallel to the central axis, and each of the inclined inner surfaces 162 has an angle with the central axis, which can be greater than 0 degrees and less than 90 degrees. In other words, the each of the inclined inner surfaces 162 is neither parallel nor orthogonal to the central axis. The reflection reduction area 170 is disposed on one of the inclined inner surfaces 162 closest to the is image-end opening 141, wherein the reflection reduction area 170 and the plastic barrel 120 are integrally formed by an injection molding method. Therefore, it is favorable for reducing the ghost image resulted from the non-imaging light totally reflected from the lens element to the image surface and improving the image quality by the reflection reduction area 170 disposed close to the image-end opening 141, so that the optical lens module 100 can be applied to the cameras with high-pixels.

In FIG. 2A, the non-imaging light Li would be reflected from the surface of the IR-cut filter (not shown) to the reflection reduction area 170 of the plastic barrel 120, and would be reflected from the reflection reduction area 170 of the plastic barrel 120 to the object-side surface 117 of the lens element 116 as the non-imaging light Lo, wherein the non-imaging light Lo is attenuated much from the non-imaging light Li, so that the strength of the non-imaging light Lo is much less than the strength of the non-imaging light Li. Therefore, it is favorable for reducing the ghost image resulted from the non-imaging light totally reflected from the lens element to the image surface.

In details, the plastic barrel 120 can be made of polycarbonate material. Therefore, it is favorable for maintaining the low reflection of the reflection reduction area 170. In the 1st embodiment, the plastic barrel 120 is made of black polycarbonate material.

Figure 2B:
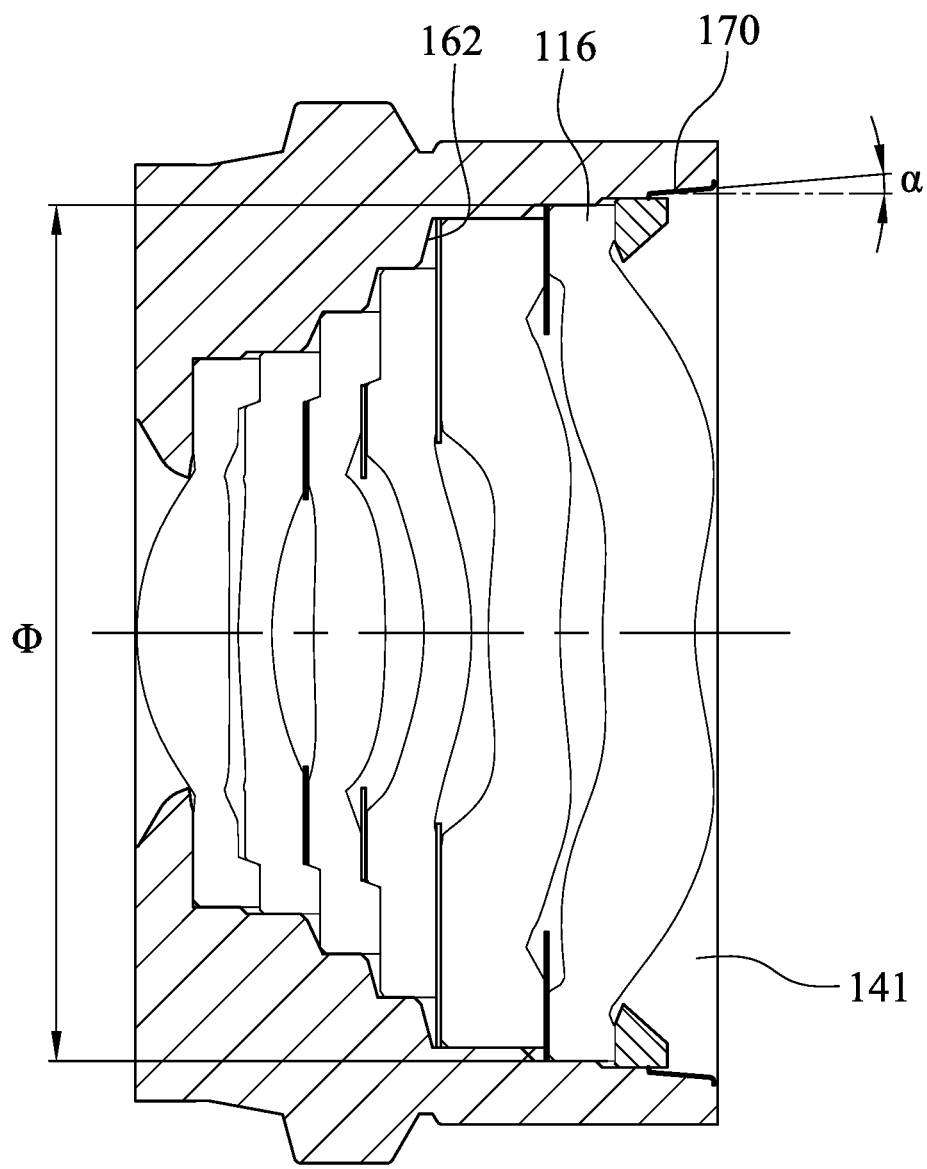
FIG. 2B shows a schematic view of the parameters α and φ of the optical lens module according to the 1st embodiment.

FIG. 2B shows a schematic view of the parameters α and φ of the optical lens module 100 according to the 1st embodiment. When an angle between the one of the inclined inner surfaces 162 closest to the image-end opening 141, which the reflection reduction area 170 is disposed thereon, and the central axis is α, the following condition can be satisfied: 1.0 degrees<α<25.0 degrees. Therefore, it is favorable for maintaining the low reflection and the manufacturing quality of the reflection reduction area 170 and the plastic barrel 120. Preferably, the following condition is satisfied: 2.0 degrees<α<20.0 degrees.

Figure 2C:
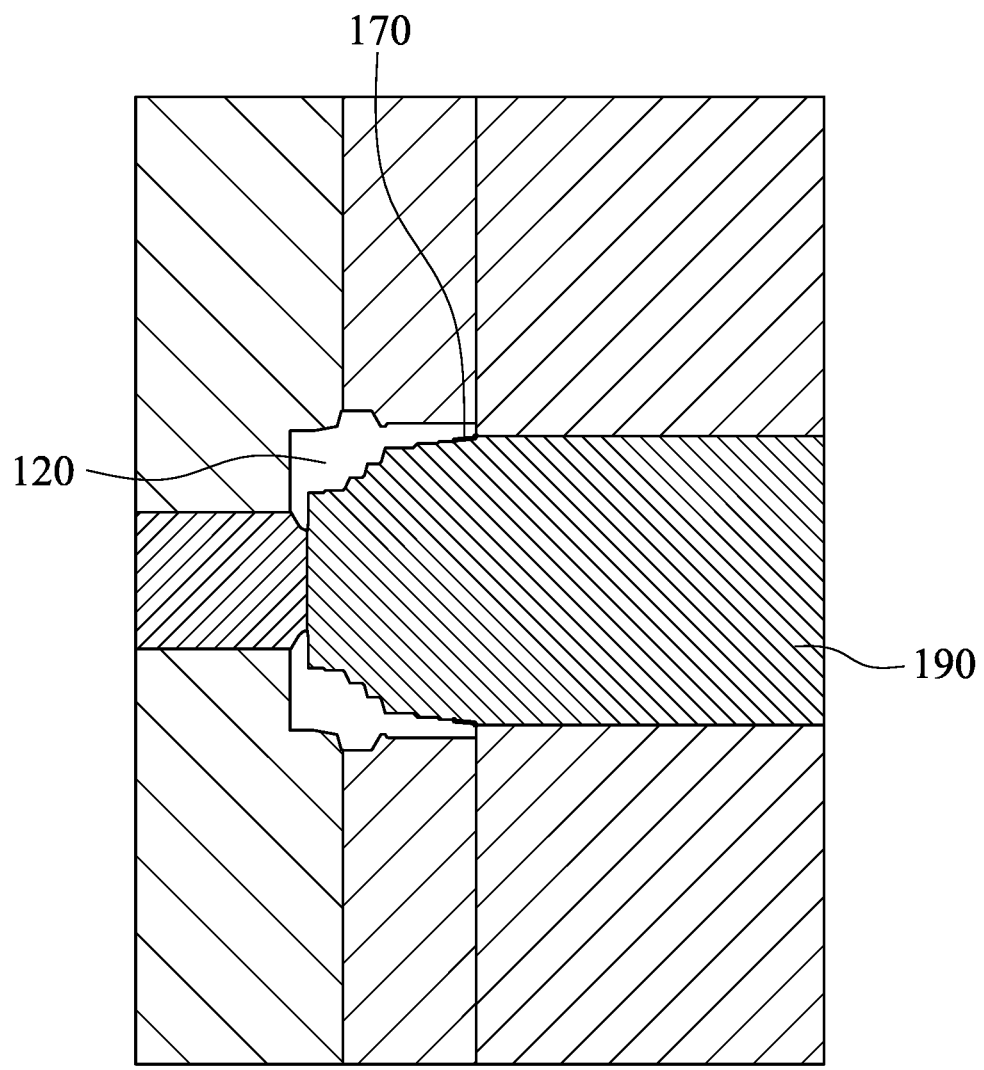
FIG. 2C shows a schematic view of the molding part of the plastic barrel according to the 1st embodiment.

FIG. 2C shows a schematic view of the molding part of the plastic barrel 120 according to the 1st embodiment. A surface finishing portion 190 corresponds to the reflection reduction area 170, and a surface of the surface finishing portion 190 can be processed by sand-blasting, electrical discharge machining (EDM), or laser related etching methods. As a consequence, the surface property of the surface finishing portion 190 would be transferred to the reflection reduction area 170 in a plastic injection molding process, so we can say the reflection reduction area 170 is formed by sand-blasting, electrical discharge machining, or laser related etching methods indirectly, or we can say the reflection reduction area 170 is manufactured by sand-blasting, electrical discharge machining, or laser related etching methods. It should be noted that FIG. 2C is for expressing how sand-blasting indirectly is enforced, instead of a limited disclosure of molding of the plastic barrel 120.

Moreover, a number of the reflection reduction area 170 can be at least three, and the three reflection reduction areas 170 are disposed on the one of the inclined inner surfaces 162 closest to the image-end opening 141, the object-end portion 130 and the image-end portion 140, respectively. According to the 1st embodiment of the present disclosure, the optical lens module 100 includes one reflection reduction area 170 disposed on the one of the inclined inner surfaces 162 closest to the image-end opening 141. Therefore, it is favorable for obtaining the low reflection of the reflection reduction areas 170 and the superior yield rate of the injection molding method. Furthermore, the is reflection reduction areas 170 can be formed by sand-blasting indirectly. Therefore, it is favorable for obtaining the optimally low reflection of the plastic barrel 120.

According to the 1st embodiment of the present disclosure, when a surface roughness of the reflection reduction area 170 is Ra, the following condition can be satisfied: 0.18 μm<Ra<3.5 μm. Therefore, it is favorable for maintaining the low reflection of the reflection reduction area 170.

In details, the lens assembly 110 includes, in order from an object side to an image side, a first lens element 111, a second lens element 112, a third lens element 113, a fourth lens element 114, a fifth lens element 115 and a sixth lens element 116, wherein the sixth lens element 116 is the one of the lens elements closest to the image-end opening 141.

According to the 1st embodiment of the present disclosure, when a refractive index of the one of the lens elements closest to the image-end opening 141 (the sixth lens element 116) is n, the following condition can be satisfied: 1.45<n<1.62. Therefore, it is favorable for increasing the critical angle of the sixth lens element 116 so as to reduce the total reflection thereon.

In FIG. 2B, when an outer diameter of the one of the lens elements closest to the image-end opening 141 (the sixth lens element 116) is α, the following condition can be satisfied: 5.85 mm<α<9.5 mm. Therefore, it is favorable for satisfying the optical requirements of high-pixels.

According to the 1st embodiment of the present disclosure, a number of the parallel inner surfaces 161 can be at least six. Therefore, it is favorable for obtaining the convenience of assembling of the lens assembly 110 so as to reduce the disorder among the lens elements during assembling.

According to the 1st embodiment of the present disclosure, at least three of the lens elements can be connected to the parallel inner surfaces 161. Therefore, it is favorable for obtaining the better resolution of the optical lens module 100.

According to the 1st embodiment of the present disclosure, the optical lens module 100 can further include an annular retaining member 180, which is for disposing the lens assembly 110 in the plastic barrel 120. Therefore, it is favorable for maintaining the assembling stability of the optical lens module 100. Furthermore, the annular retaining member 180 is located on the inner tube portion 160 and near the image-end opening 141.

According to the 1st embodiment of the present disclosure, at least one of the parallel inner surfaces 161 can be connected to the annular retaining member 180. Therefore, it is favorable for maintaining the assembling stability of the optical lens module 100.

The data of the aforementioned parameters of the optical lens module 100 according to the 1st embodiment of the present disclosure are listed in the following Table 1A, wherein a value of the surface finishing corresponding to Ra is VDI (Verein Deutscher Ingenieure), and a drafting angle corresponding to Ra is DA-PC. The data are also shown as FIG. 2B.

In addition, the corresponding values of VDI, Ra, DA-PC, DA-PA and DA-ABS are listed in the following Table 1B and for general reference, wherein DA-PC, DA-PA and DA-ABS are the draft angles of the materials of polycarbonate, polyamide and acrilnitrile-butadiene-styrol respectively, and the relationship between VDI and Ra is as following: VDI=20×log(10×Ra). It is should be noted that the actual angles of DA-PC, DA-PA and DA-ABS may differ from 0.5 degrees to 1 degrees among individual manufacturers.

TABLE 1A

1st Embodiment

| Φ (mm) | 6.4 | Ra (μm) | 0.4~0.56 |
|---|---|---|---|
| n | 1.535 | VDI | 12~15 |
| α (deg.) | 4.8 | DA-PC (deg.) | 1 |

Reference wavelength for parameter n is 587.6 nm (d-line).

TABLE 1B

Reference of Surface Roughness

| VDI | Ra (μm) | DA-PC (deg.) | DA-PA (deg.) | DA-ABS (deg.) |
|---|---|---|---|---|
| 10 | 0.32 | 1.0 | 0.0 | 0.5 |
| 12 | 0.40 | 1.0 | 0.0 | 0.5 |
| 15 | 0.56 | 1.0 | 0.5 | 0.5 |
| 18 | 0.80 | 1.0 | 0.5 | 0.5 |
| 21 | 1.12 | 1.0 | 0.5 | 0.5 |
| 24 | 1.60 | 1.5 | 0.5 | 1.0 |
| 27 | 2.24 | 2.0 | 1.0 | 1.5 |
| 30 | 3.15 | 2.0 | 1.5 | 2.0 |
| 33 | 4.50 | 3.0 | 2.0 | 2.5 |
| 36 | 6.30 | 4.0 | 2.5 | 3.0 |
| 39 | 9.00 | 5.0 | 3.0 | 4.0 |
| 42 | 12.50 | 6.0 | 4.0 | 5.0 |

2nd Embodiment

Figure 3A:
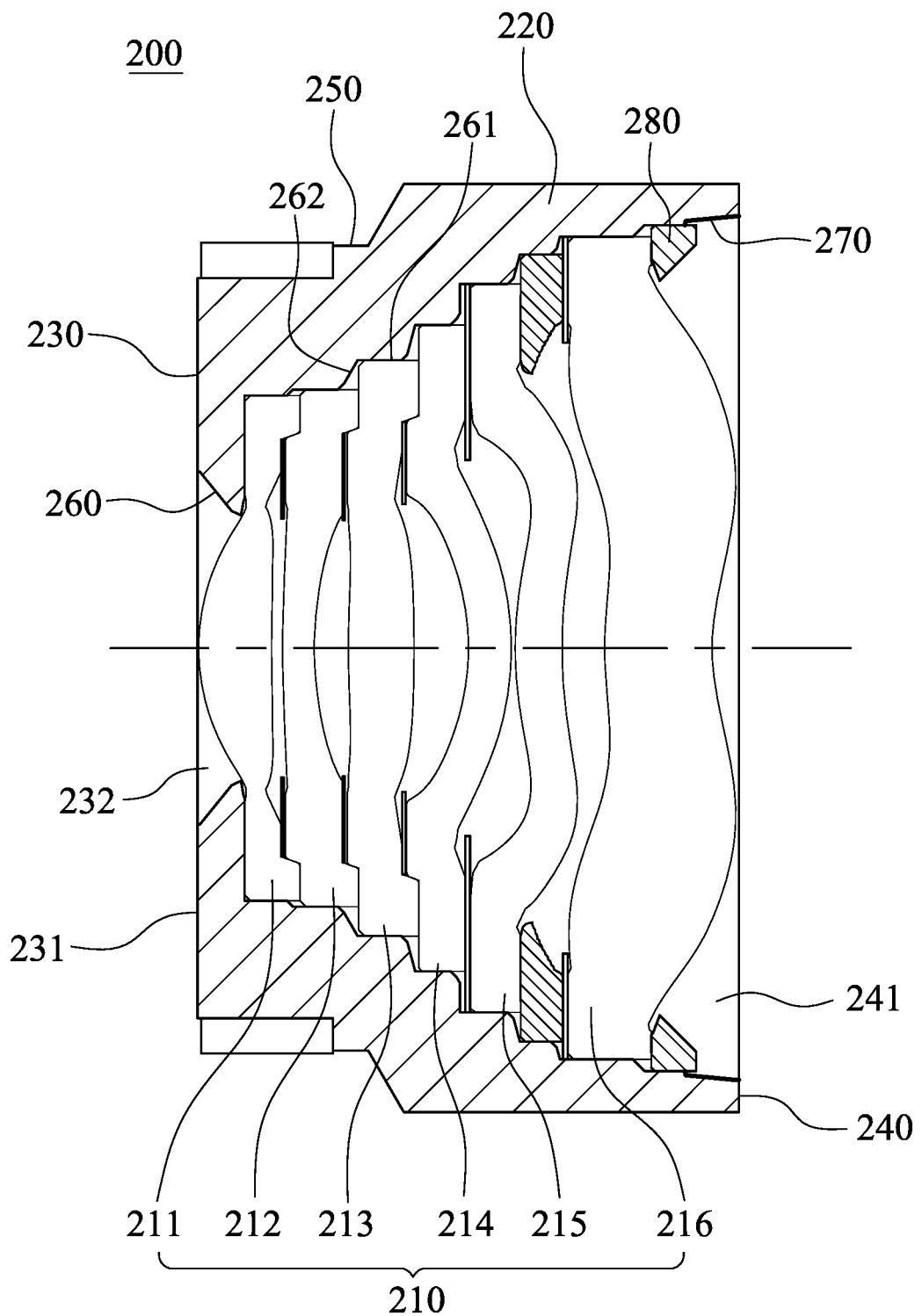
FIG. 3A is a schematic view of an optical lens module according to the 2nd embodiment of the present disclosure.

FIG. 3A is a schematic view of an optical lens module 200 according to the 2nd embodiment of the present disclosure. In the 2nd embodiment, an optical lens module 200 includes a lens assembly 210, a plastic barrel 220 and an annular retaining member 280.

The lens assembly 210 includes a plurality of lens elements (211-216) and is disposed in the plastic barrel 220. The plastic barrel 220 includes an object-end portion 230, an image-end portion 240, an outer tube portion 250, an inner tube portion 260 and a reflection reduction area 270. The object-end portion 230 includes an object-end surface 231 and an object-end hole 232. The image-end portion 240 includes an image-end opening 241. The outer tube portion 250 connects the object-end portion 230 and the image-end portion 240. The inner tube portion 260 connects the object-end portion 230 and the is image-end portion 240, wherein the inner tube portion 260 is closer to a central axis of the plastic barrel 220 than the outer tube portion 250. The inner tube portion 260 includes a plurality of parallel inner surfaces 261 and a plurality of inclined inner surfaces 262, wherein the parallel inner surfaces 261 are parallel to the central axis, and each of the inclined inner surfaces 262 has an angle with the central axis. The reflection reduction area 270 is disposed on one of the inclined inner surfaces 262 closest to the image-end opening 241, wherein the reflection reduction area 270 and the plastic barrel 220 are integrally formed by an injection molding method. Furthermore, the plastic barrel 220 is made of black polycarbonate material, and the reflection reduction area 270 is formed by sand-blasting indirectly.

The lens assembly 210 includes, in order from an object side to an image side, a first lens element 211, a second lens element 212, a third lens element 213, a fourth lens element 214, a fifth lens element 215 and a sixth lens element 216, wherein the sixth lens element 216 is the one of the lens elements closest to the image-end opening 241.

A number of the parallel inner surfaces 261 is at least six, and at least three of the lens elements are connected to the parallel inner surfaces 261.

The annular retaining member 280, which is located on the inner tube portion 260 and near the image-end opening 241, is for disposing the lens assembly 210 in the plastic barrel 220, and at least one of the parallel inner surfaces 261 is connected to the annular retaining member 280.

Figure 3B:
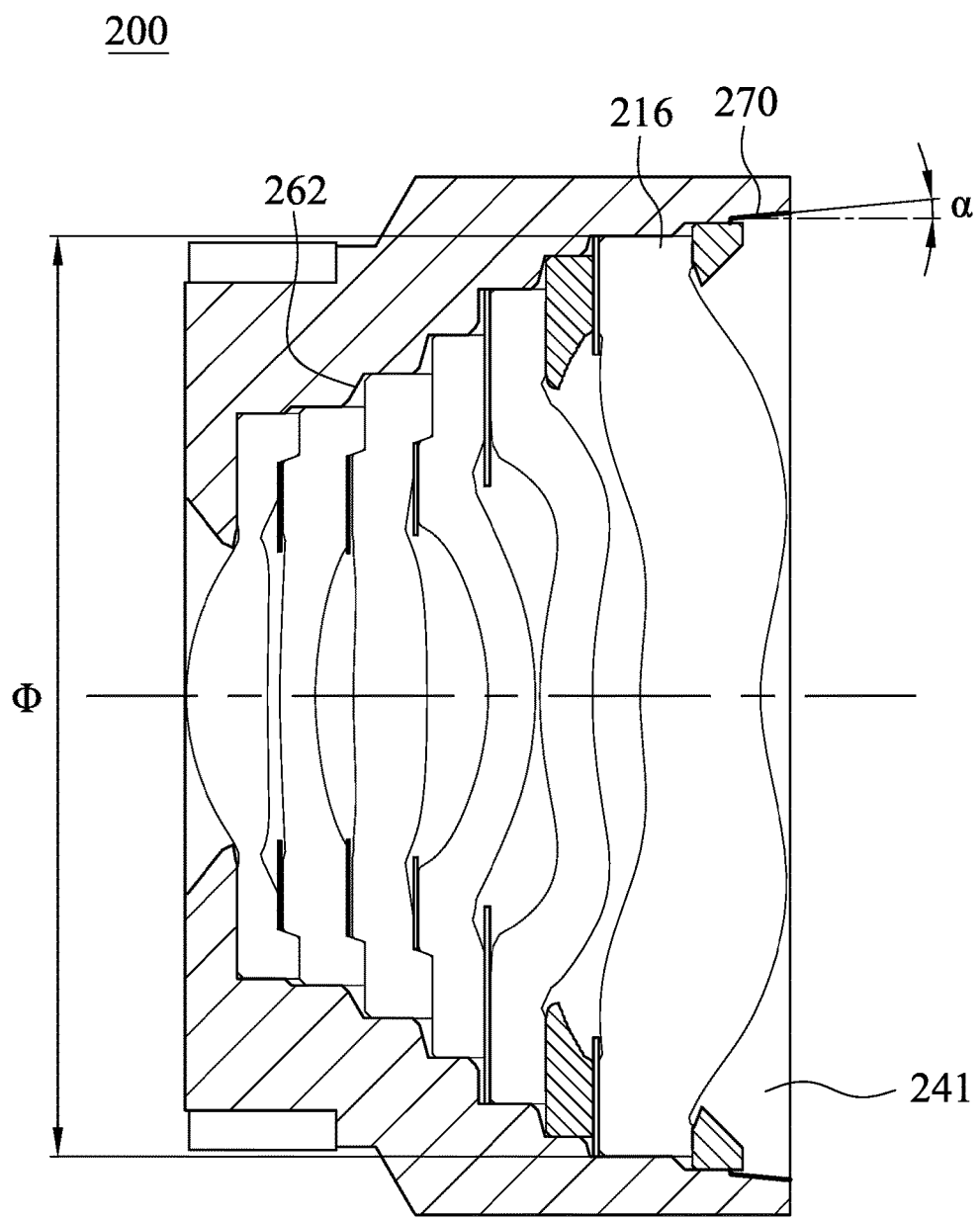
FIG. 3B shows a schematic view of the parameters α and φ of the optical lens module according to the 2nd embodiment.

FIG. 3B shows a schematic view of the parameters α and ϕ of the optical lens module 200 according to the 2nd embodiment. The data of the parameters ϕ, n, α, Ra, VDI and DA-PC of the optical lens module 200 according to the 2nd embodiment of the present disclosure are listed in the following Table 2. The definitions of these parameters shown in Table 2 are the same as those stated in the 1st embodiment with corresponding values for the 2nd embodiment.

TABLE 2

2nd Embodiment

| Φ (mm) | 7 | Ra (μm) | 1.12~1.6 |
|---|---|---|---|
| n | 1.535 | VDI | 23 |
| α (deg.) | 5.4 | DA-PC (deg.) | 1~1.5 |

Reference wavelength for parameter n is 587.6 nm (d-line).

3rd Embodiment

Figure 4A:
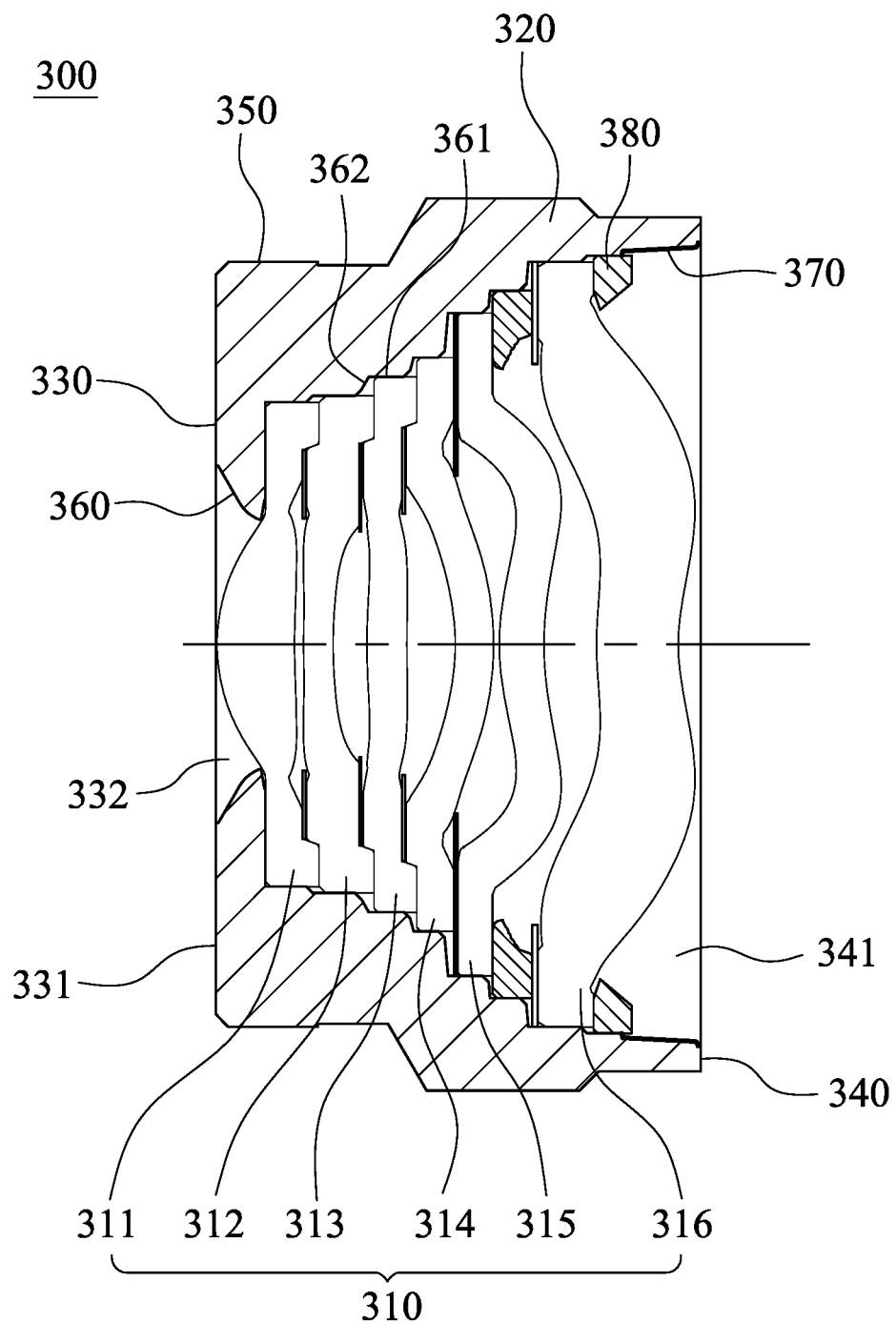
FIG. 4A is a schematic view of an optical lens module according to the 3rd is embodiment of the present disclosure.

FIG. 4A is a schematic view of an optical lens module 300 according to the 3rd embodiment of the present disclosure. In the 3rd embodiment, an optical lens module 300 includes a lens assembly 310, a plastic barrel 320 and an annular retaining member 380.

The lens assembly 310 includes a plurality of lens elements (311-316) and is disposed in the plastic barrel 320. The plastic barrel 320 includes an object-end portion 330, an image-end portion 340, an outer tube portion 350, an inner tube portion 360 and a reflection reduction area 370. The object-end portion 330 includes an object-end surface 331 and an object-end hole 332. The image-end portion 340 includes an image-end opening 341. The outer tube portion 350 connects the object-end portion 330 and the image-end portion 340. The inner tube portion 360 connects the object-end portion 330 and the image-end portion 340, wherein the inner tube portion 360 is closer to a central axis of the plastic barrel 320 than the outer tube portion 350. The inner tube portion 360 includes a plurality of parallel inner surfaces 361 and a plurality of inclined inner surfaces 362, wherein the parallel inner surfaces 361 are parallel to the central axis, and each of the inclined inner surfaces 362 has an angle with the central axis. The reflection reduction area 370 is disposed on one of the inclined inner surfaces 362 closest to the image-end opening 341, wherein the reflection reduction area 370 and the plastic barrel 320 are integrally formed by an injection molding method. Furthermore, the plastic barrel 320 is made of black polycarbonate material, and the reflection reduction area 370 is formed by sand-blasting indirectly.

The lens assembly 310 includes, in order from an object side to an image side, a first lens element 311, a second lens element 312, a third lens element 313, a fourth lens element 314, a fifth lens element 315 and a sixth lens element 316, wherein the sixth lens element 316 is the one of the lens elements closest to the image-end opening 341.

A number of the parallel inner surfaces 361 is at least six, and at least three of the lens elements are connected to the parallel inner surfaces 361.

The annular retaining member 380, which is located on the inner tube portion 360 and near the image-end opening 341, is for disposing the lens assembly 310 in the plastic barrel 320, and at least one of the parallel inner surfaces 361 is connected to the annular retaining member 380.

Figure 4B:
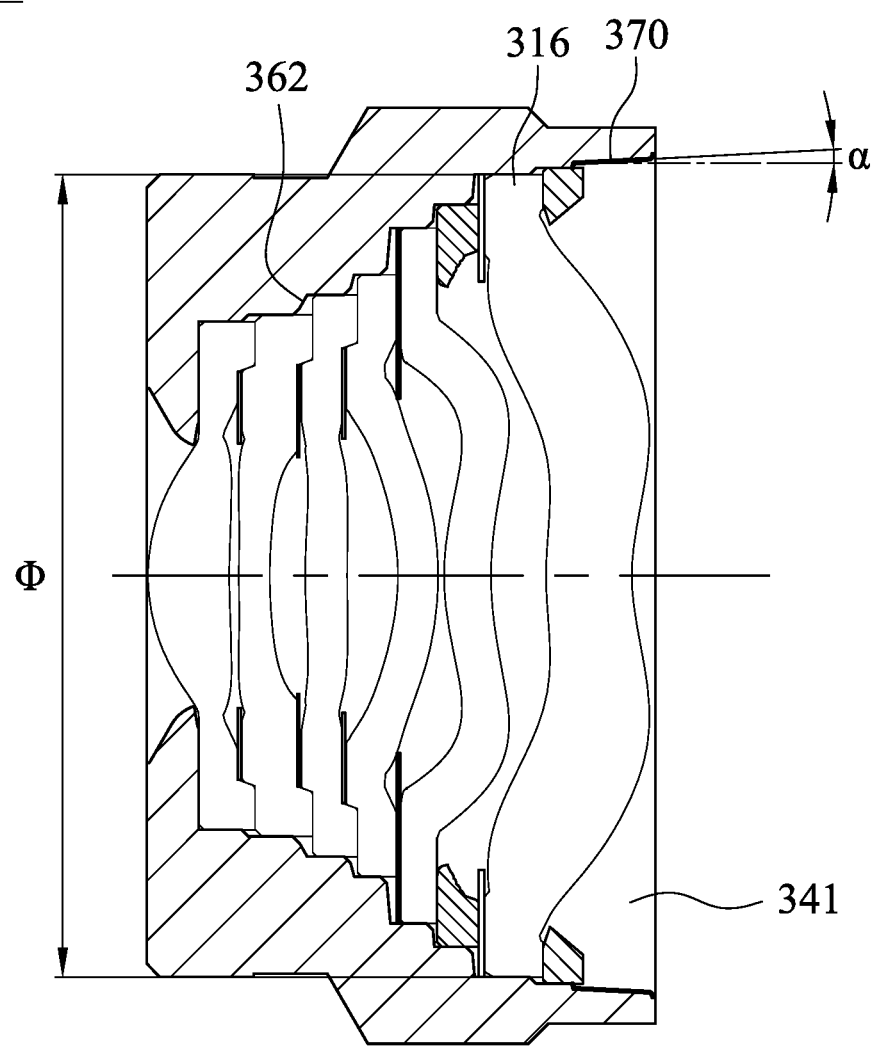
FIG. 4B shows a schematic view of the parameters α and φ of the optical lens module according to the 3rd embodiment.

FIG. 4B shows a schematic view of the parameters α and ϕ of the optical lens module 300 according to the 3rd embodiment. The data of the parameters ϕ, n, α, Ra, VDI and DA-PC of the optical lens module 300 according to the 3rd embodiment of the present disclosure are listed in the following Table 3. The definitions of these parameters shown in Table 3 are the same as those stated in the 1st embodiment with corresponding values for the 3rd embodiment.

TABLE 3

3rd Embodiment

| Φ (mm) | 6 | Ra (μm) | 0.4~0.8 |
|---|---|---|---|
| n | 1.544 | VDI | 12~18 |
| α (deg.) | 3.0 | DA-PC (deg.) | 1 |

Reference wavelength for parameter n is 587.6 nm (d-line).

4th Embodiment

Figure 5A:
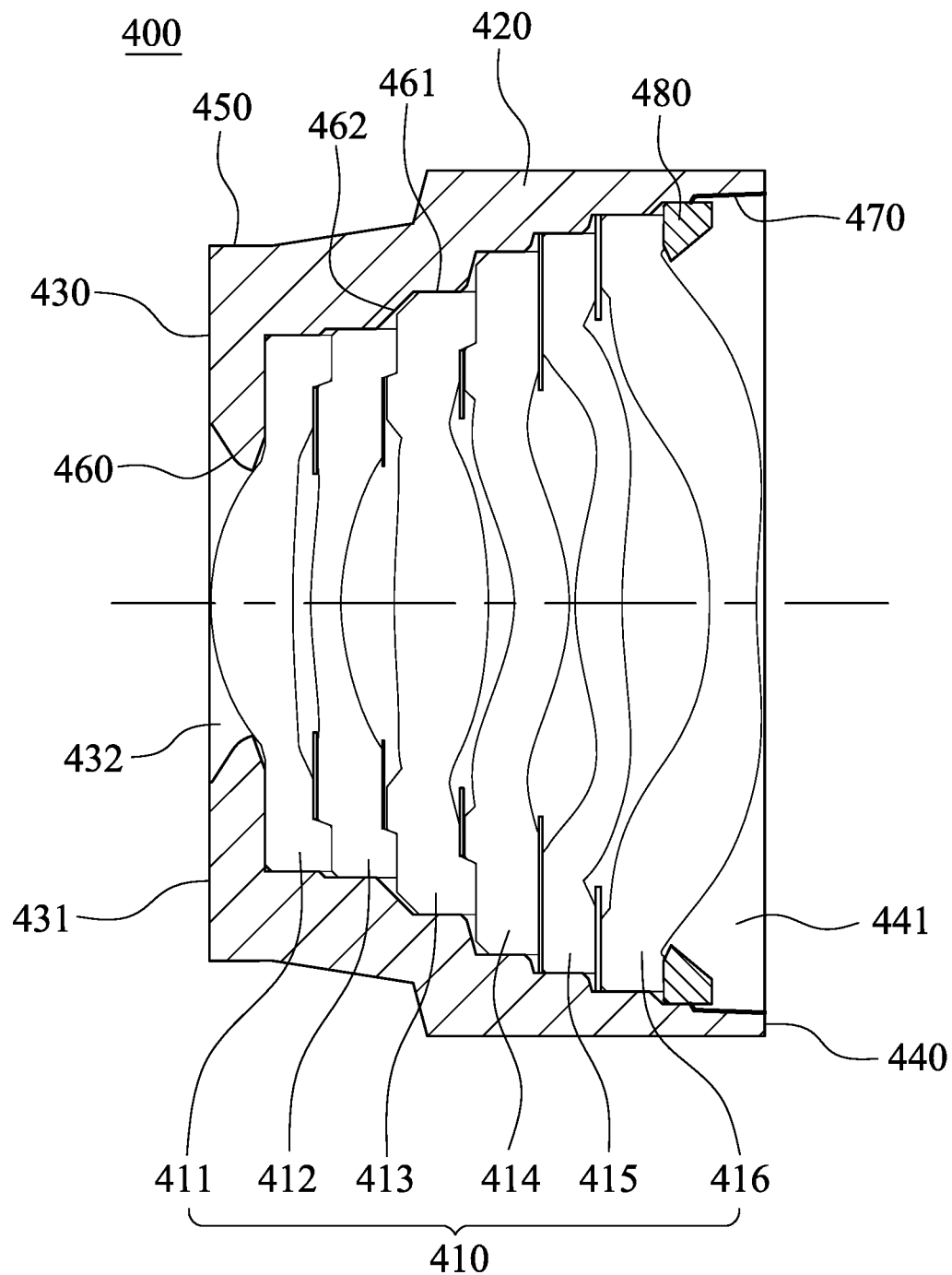
FIG. 5A is a schematic view of an optical lens module according to the 4th embodiment of the present disclosure.

FIG. 5A is a schematic view of an optical lens module 400 according to the 4th embodiment of the present disclosure. In the 4th embodiment, an optical lens module 400 includes a lens assembly 410, a plastic barrel 420 and an annular retaining member 480.

The lens assembly 410 includes a plurality of lens elements (411-416) and is disposed in the plastic barrel 420. The plastic barrel 420 includes an object-end portion 430, an image-end portion 440, an outer tube portion 450, an inner tube portion 460 and a reduction area 470. The object-end portion 430 includes an object-end surface 431 and an object-end hole 432. The to image-end portion 440 includes an image-end opening 441. The outer tube portion 450 connects the object-end portion 430 and the image-end portion 440. The inner tube portion 460 connects the object-end portion 430 and the image-end portion 440, wherein the inner tube portion 460 is closer to a central axis of the plastic barrel 420 than the outer tube portion 450. The inner tube portion 460 includes a plurality of parallel inner surfaces 461 and a plurality of inclined inner surfaces 462, wherein the parallel inner surfaces 461 are parallel to the central axis, and each of the inclined inner surfaces 462 has an angle with the central axis. The reflection reduction area 470 is disposed on one of the inclined inner surfaces 462 closest to the image-end opening 441, wherein the reflection reduction area 470 and the plastic barrel 420 are integrally formed by an injection molding method. Furthermore, the plastic barrel 420 is made of black polycarbonate material, and the reflection reduction area 470 is formed by electrical discharge machining indirectly.

The lens assembly 410 includes, in order from an object side to an image side, a first lens element 411, a second lens element 412, a third lens element 413, a fourth lens element 414, a fifth lens element 415 and a sixth lens element 416, wherein the sixth lens element 416 is the one of the lens elements closest to the image-end opening 441.

A number of the parallel inner surfaces 461 is at least six, and at least three of the lens elements are connected to the parallel inner surfaces 461.

The annular retaining member 480, which is located on the inner tube portion 460 and near the image-end opening 441, is for disposing the lens assembly 410 in the plastic barrel 420, and at least one of the parallel inner surfaces 461 is connected to the annular retaining member 480.

Figure 5B:
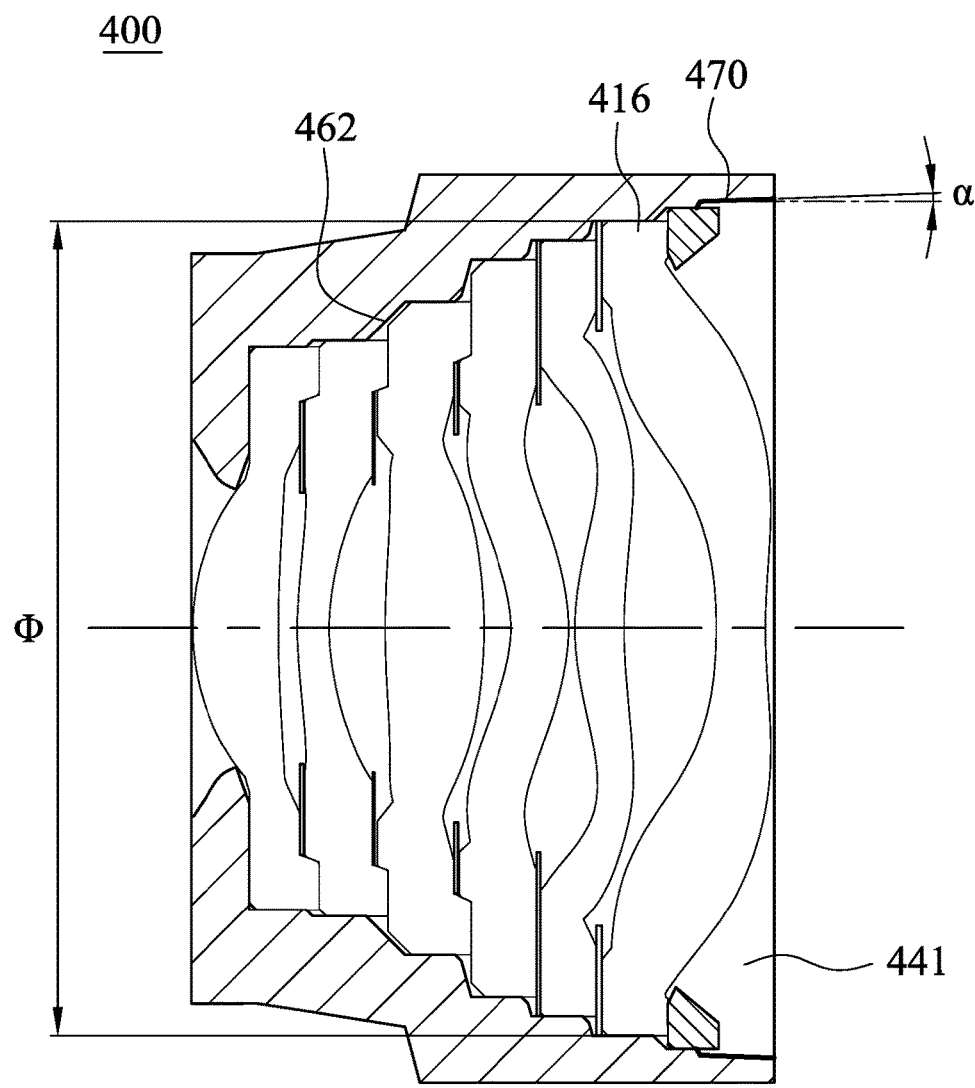
FIG. 5B shows a schematic view of the parameters α and φ of the optical lens module according to the 4th embodiment.

FIG. 5B shows a schematic view of the parameters α and φ of the optical lens module 400 according to the 4th embodiment. The data of the parameters φ, n, α, Ra, VDI and DA-PC of the optical lens module 400 according to the 4th embodiment of the present disclosure are listed in the following Table 4. The definitions of these parameters shown in Table 4 are the same as those stated in is the 1st embodiment with corresponding values for the 4th embodiment.

TABLE 4

4th Embodiment

| Φ (mm) | 6.3 | Ra (μm) | 0.4~0.56 |
|---|---|---|---|
| n | 1.544 | VDI | 12~15 |
| α (deg.) | 2.1 | DA-PC (deg.) | 1 |

Reference wavelength for parameter n is 587.6 nm (d-line).

5th Embodiment

Figure 6A:
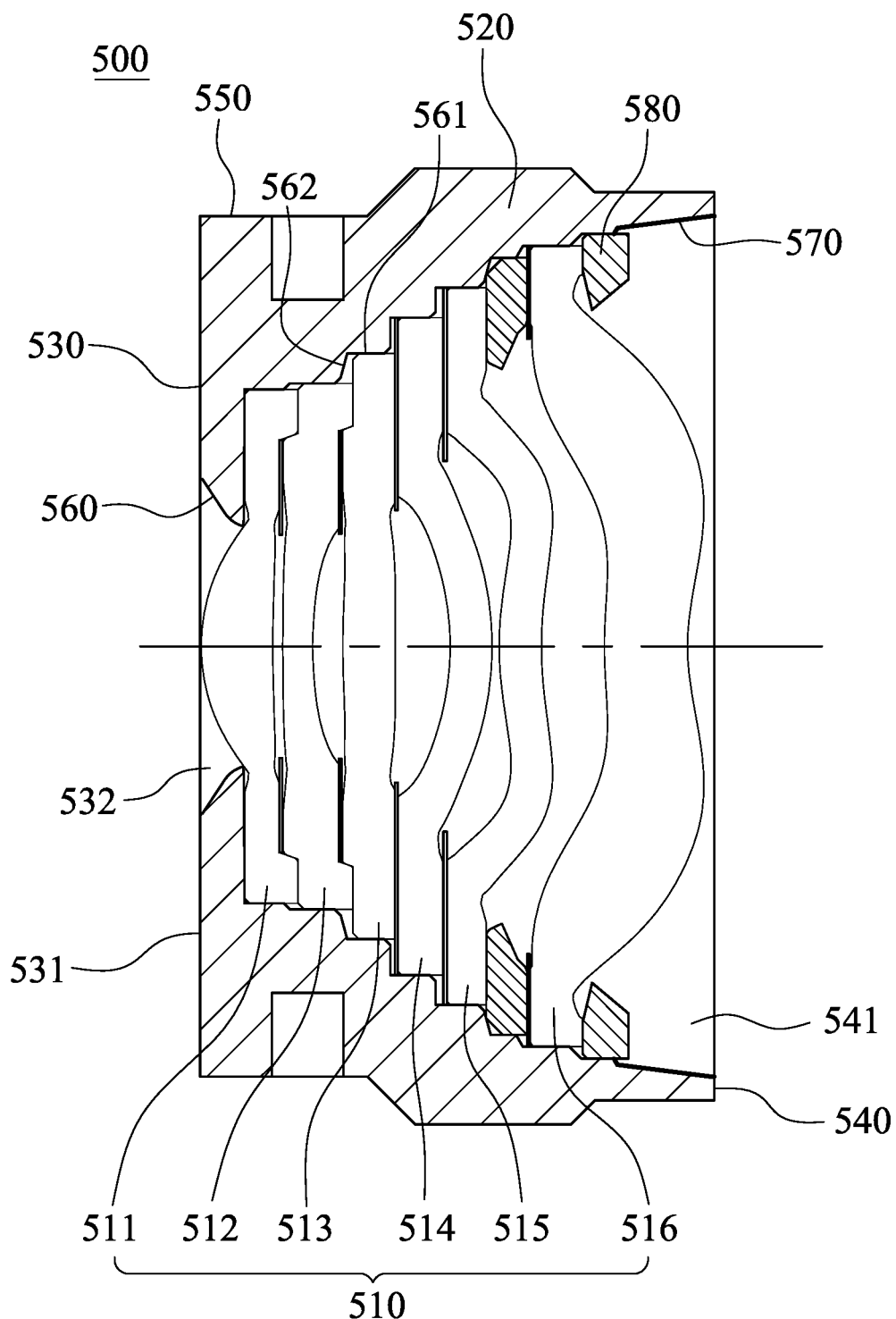
FIG. 6A is a schematic view of an optical lens module according to the 5th embodiment of the present disclosure.

FIG. 6A is a schematic view of an optical lens module 500 according to the 5th embodiment of the present disclosure. In the 5th embodiment, an optical lens module 500 includes a lens assembly 510, a plastic barrel 520 and an annular retaining member 580.

The lens assembly 510 includes a plurality of lens elements (511-516) and is disposed in the plastic barrel 520, The plastic barrel 520 includes an object-end portion 530, an image-end portion 540, an outer tube portion 550, an inner tube portion 560 and a reflection reduction area 570. The object-end portion 530 includes an object-end surface 531 and an object-end hole 532.

The image-end portion 540 includes an image-end opening 541. The outer tube portion 550 connects the object-end portion 530 and the image-end portion 540. The inner tube portion 560 connects the object-end portion 530 and the image-end portion 540, wherein the inner tube portion 560 is closer to a central axis of the plastic barrel 520 than the outer tube portion 550. The inner tube portion 560 includes a plurality of parallel inner surfaces 561 and a plurality of inclined inner surfaces 562, wherein the parallel inner surfaces 561 are parallel to the central axis, and each of the inclined inner surfaces 562 has an angle with the central axis. The reflection reduction area 570 is disposed on one of the is inclined inner surfaces 562 closest to the image-end opening 541, wherein the reflection reduction area 570 and the plastic barrel 520 are integrally formed by an injection molding method. Furthermore, the plastic barrel 520 is made of black polycarbonate material, and the reflection reduction area 570 is formed by electrical discharge machining Indirectly.

The lens assembly 510 includes, in order from an object side to an image side, a first lens element 511, a second lens element 512, a third lens element 513, a fourth lens element 514, a fifth lens element 515 and a sixth lens element 516, wherein the sixth lens element 516 is the one of the lens elements closest to the image-end opening 541.

A number of the parallel inner surfaces 561 is at least six, and at least three of the lens elements are connected to the parallel inner surfaces 561.

The annular retaining member 580, which is located on the inner tube portion 560 and near the image-end opening 541, is for disposing the lens assembly 510 in the plastic barrel 520, and at least one of the parallel inner surfaces 561 is connected to the annular retaining member 580.

Figure 6B:
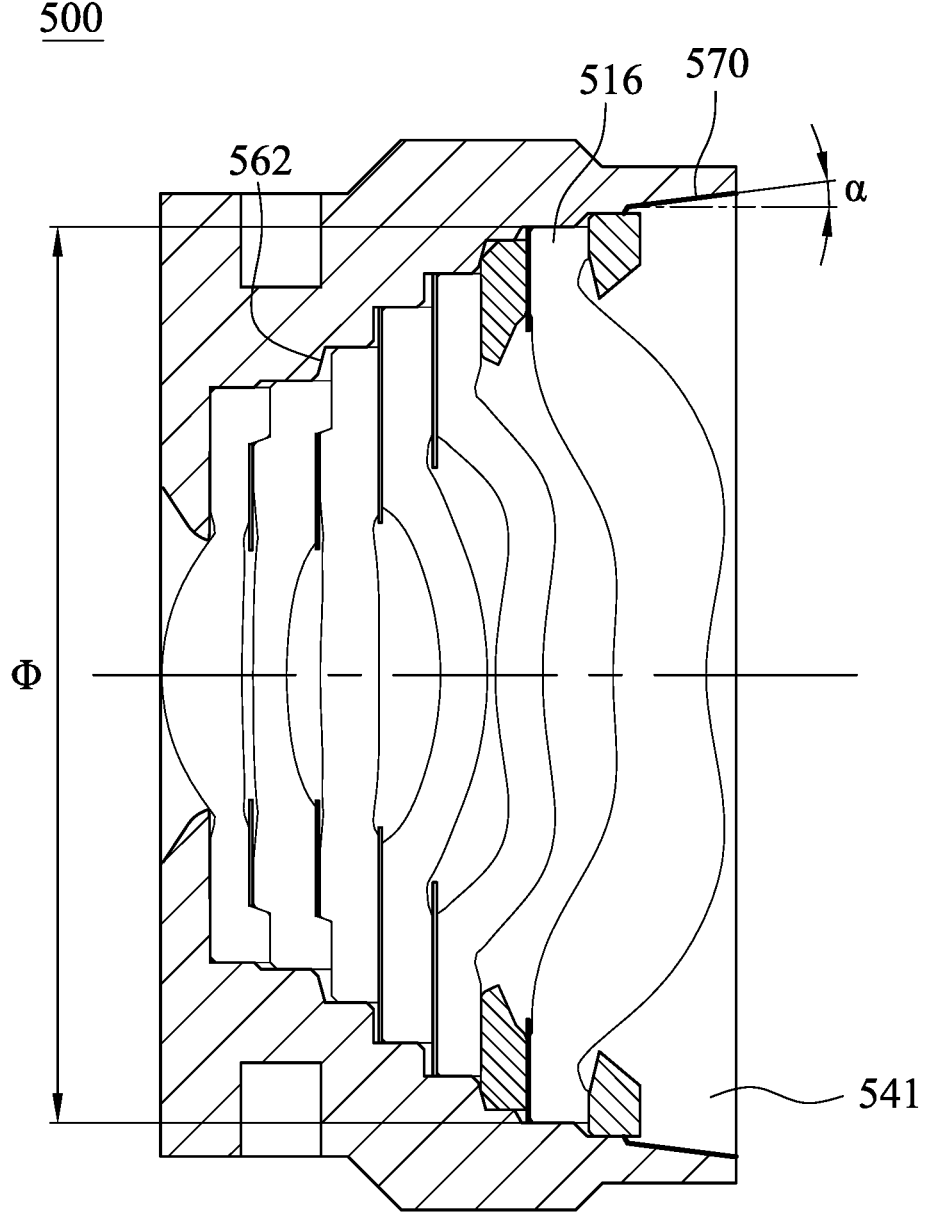
FIG. 6B shows a schematic view of the parameter α and φ of the optical lens module according to the 5th embodiment.

FIG. 6B shows a schematic view of the parameters α and φ of the optical lens module 500 according to the 5th embodiment, The data of the parameters φ, n, α, Ra, VDI and DA-PC of the optical lens module 500 according to the 5th embodiment of the present disclosure are listed in the following Table 5. The definitions of these parameters shown in Table 5 are the same as those stated in the 1st embodiment with corresponding values for the 5th embodiment.

TABLE 5

5th Embodiment

| Φ (mm) | 6.7 | Ra (μm) | 2.24~3.15 |
|---|---|---|---|
| n | 1.544 | VDI | 29 |
| α (deg.) | 7.3 | DA-PC (deg.) | 1 |

Reference wavelength for parameter n is 587.6 nm (d-line).

6th Embodiment

Figure 7A:
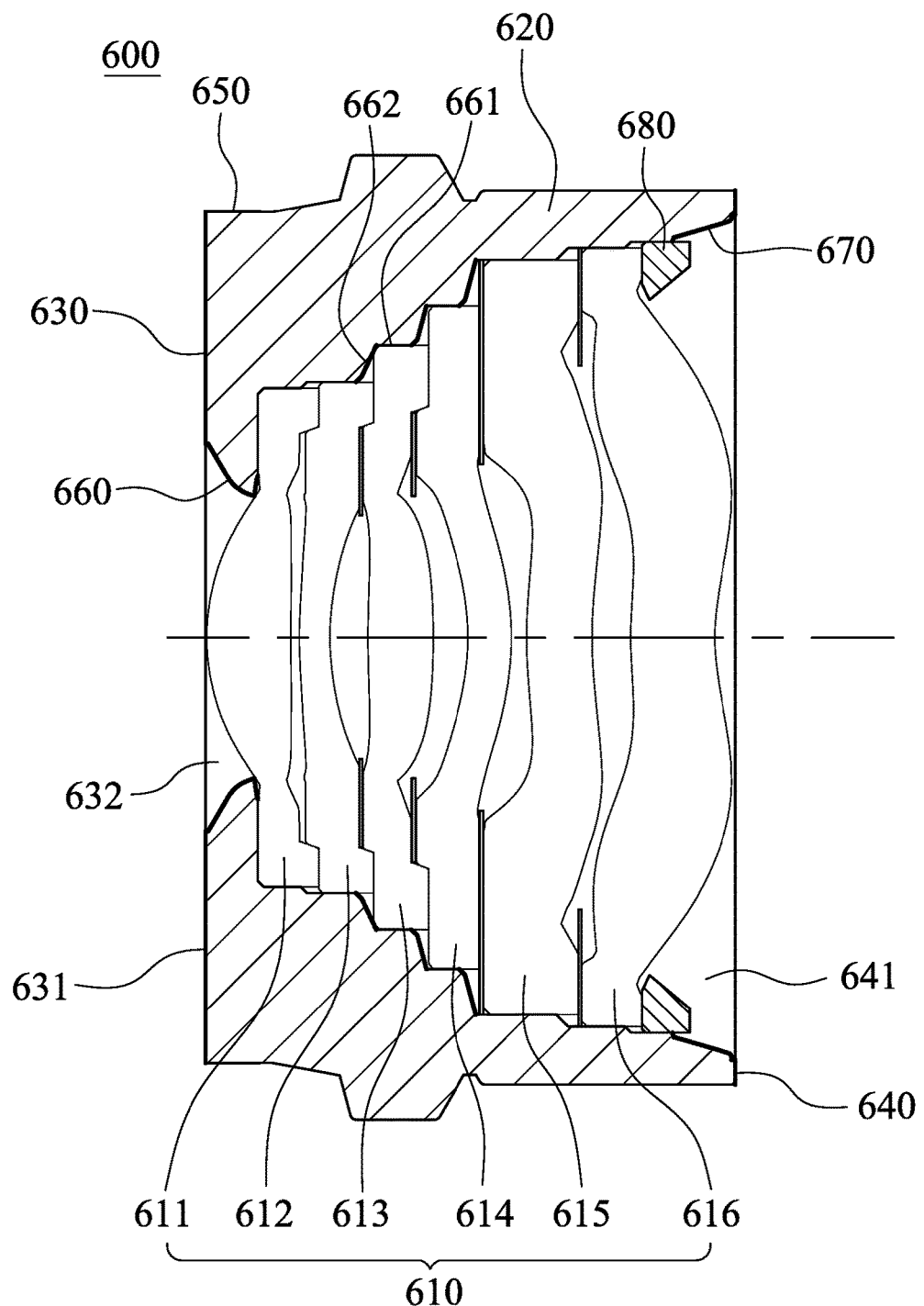
FIG. 7A is a schematic view of an optical lens module according to the 6th embodiment of the present disclosure.

FIG. 7A is a schematic view of an optical lens module 600 according to the 6th embodiment of the present disclosure. In the 6th embodiment, an optical lens module 600 includes a lens assembly 610, a plastic barrel 620 and an annular retaining member 680.

The lens assembly 610 includes a plurality of lens elements (611-616) and is disposed in the plastic barrel 620. The plastic barrel 620 includes an object-end portion 630, an image-end portion 640, an outer tube portion 650, an inner tube portion 660 and at least three reflection reduction areas 670. The object-end portion 630 includes an object-end surface 631 and an object-end hole 632. The image-end portion 640 includes an image-end opening 641. The outer tube portion 650 connects the object-end portion 630 and the image-end portion 640, The inner tube portion 660 connects the object-end portion 630 and the image-end portion 640, wherein the inner tube portion 660 is closer to a central axis of the plastic barrel 620 than the outer tube portion 650. The inner tube portion 660 includes a plurality of parallel inner surfaces 661 and a plurality of inclined inner surfaces 662, wherein the parallel inner surfaces 661 are parallel to the central axis, and each of the inclined inner surfaces 662 has to an angle with the central axis. The reflection reduction areas 670 are disposed on the inclined inner surfaces 662, especially the one of the inclined inner surfaces 662 closest to the image-end opening 641, the object-end portion 630 and the image-end portion 640, wherein the reflection reduction areas 670 and the plastic barrel 620 are integrally formed by an injection molding method. Furthermore, the plastic barrel 620 is made of black polycarbonate material, and the reflection reduction areas 670 are formed by laser related etching methods or the like indirectly.

The lens assembly 610 includes, in order from an object side to an image side, a first lens element 611, a second lens element 612, a third lens element 613, a fourth lens element 614, a fifth lens element 615 and a sixth lens element 616, wherein the sixth lens element 616 is the one of the lens elements closest to the image-end opening 641.

A number of the parallel inner surfaces 661 is at least six, and at least three of the lens elements are connected to the parallel inner surfaces 661.

The annular retaining member 680, which is located on the inner tube portion 660 and near the image-end opening 641, is for disposing the lens assembly 610 in the plastic barrel 620, and at least one of the parallel inner surfaces 661 is connected to the annular retaining member 680.

Figure 7B:
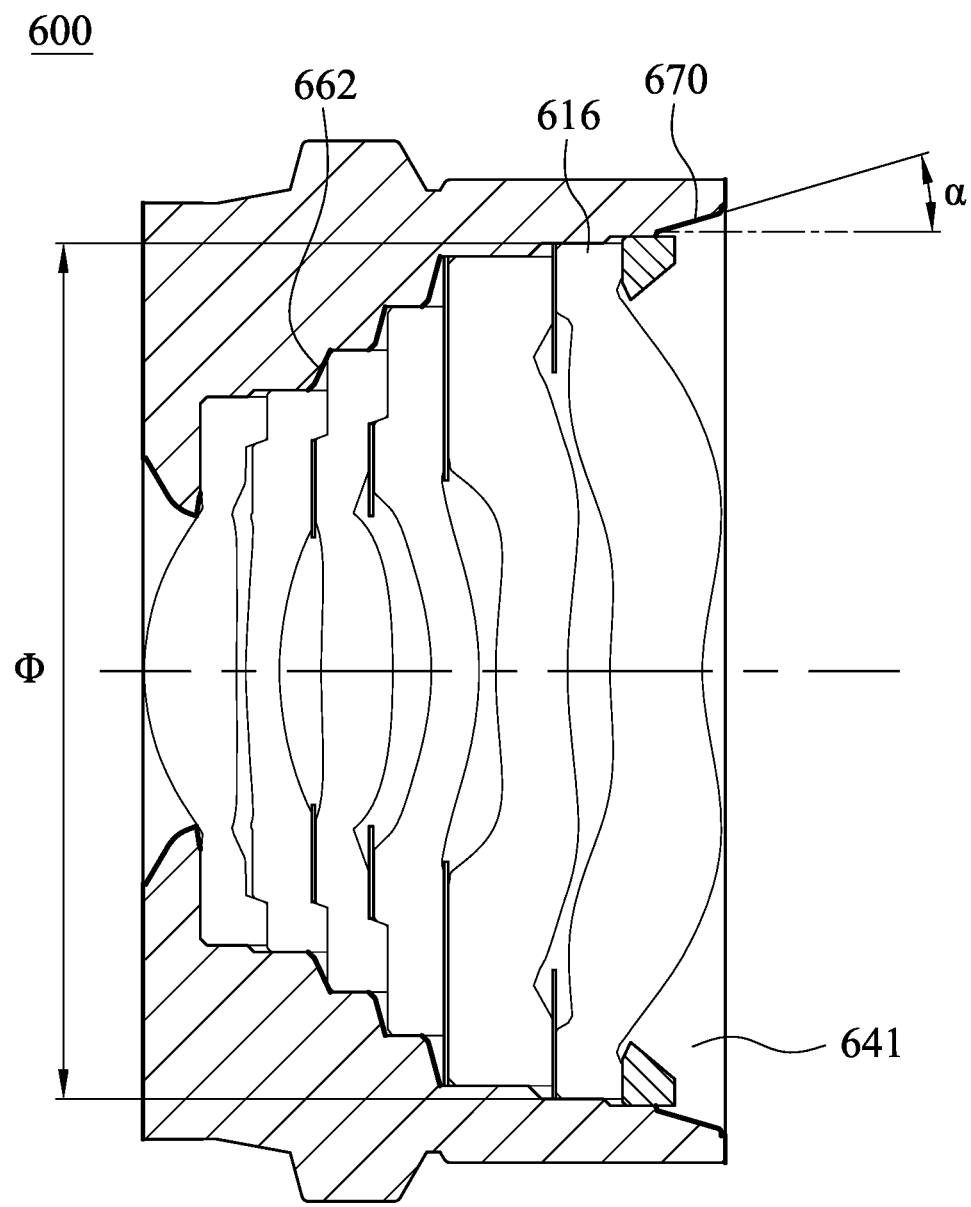
FIG. 7B shows a schematic view of the parameters α and φ of the optical lens module according to the 6th embodiment.

FIG. 7B shows a schematic view of the parameters α and φ of the optical lens module 600 according to the 6th embodiment. The data of the parameters φ, n, α, Ra, VDI and DA-PC of the optical lens module 600 according to the 6th embodiment of the present disclosure are listed in the following Table 6. The definitions of these parameters shown in Table 6 are the same as those stated in to the 1st embodiment with corresponding values for the 6th embodiment.

TABLE 6

| 6th Embodiment | | | |
|---|---|---|---|
| Φ (mm) | 6.4 | Ra (μm) | 2.2~2.3 |
| n | 1.544 | VDI | 27 |
| α (deg.) | 16.3 | DA-PC (deg.) | 2 |

Reference wavelength for parameter n is 587.6 nm (d-line).

7th Embodiment

Figure 8:
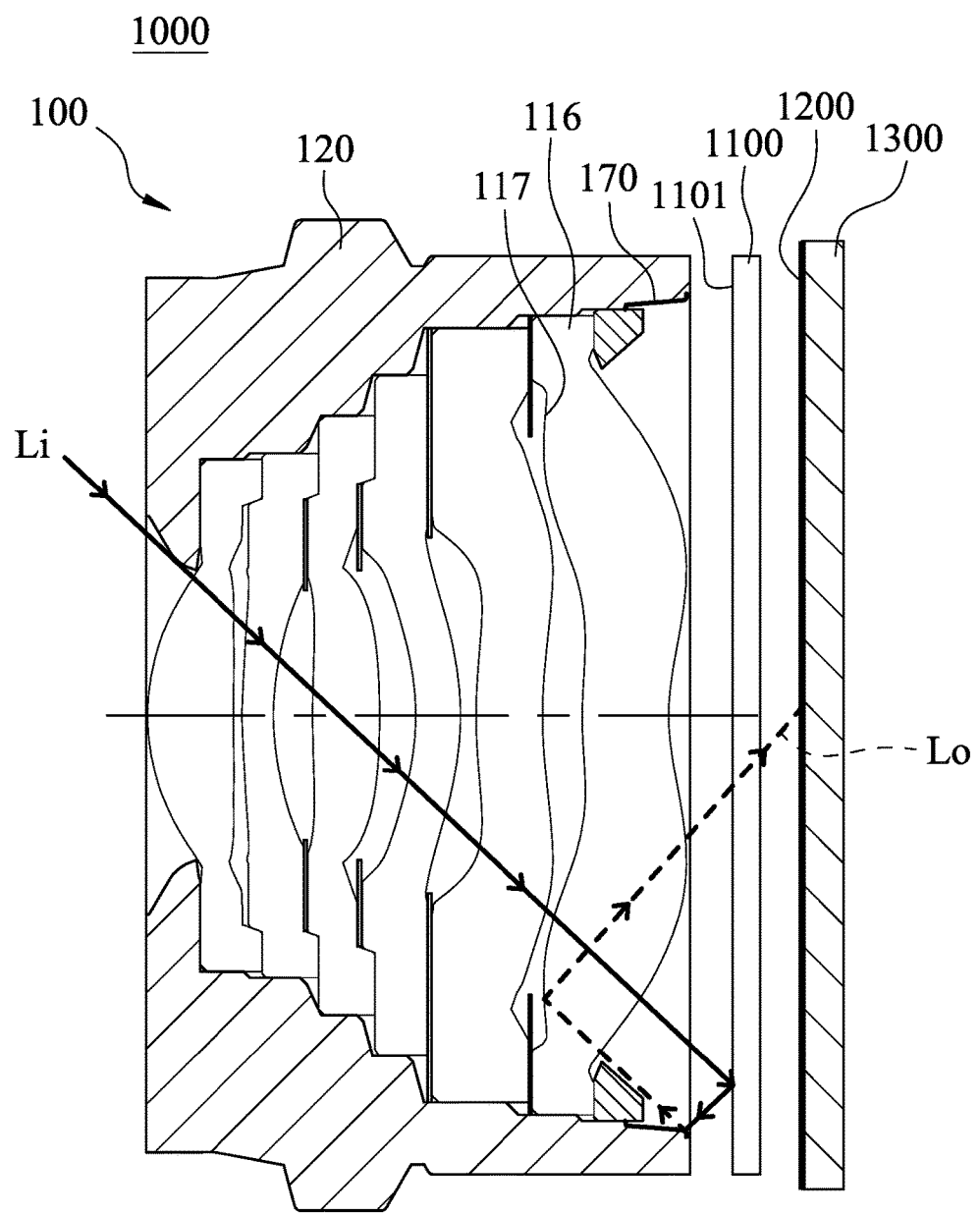
FIG. 8 shows an imaging apparatus according to the 7th embodiment of the present disclosure.

FIG. 8 shows an imaging apparatus 1000 according to the 7th embodiment of the present disclosure. In the 7th embodiment, an imaging apparatus 1000 includes the optical lens module 100 according to the 1st embodiment of the present disclosure, an IR-cut filter 1100 and an image sensor 1300.

In FIG. 2A, the optical lens module 100 includes the lens assembly 110, the plastic barrel 120 and the annular retaining member 180. The lens assembly 110 includes the lens elements (111-116) and is disposed in the plastic barrel 120. The plastic barrel 120 includes the object-end portion 130, the image-end portion 140, the outer tube portion 150, the inner tube portion 160 and the reflection reduction area 170. The object-end portion 130 includes the object-end surface 131 and the object-end hole 132. The image-end portion 140 includes the image-end opening 141. The outer tube portion 150 connects the object-end portion 130 and the image-end portion 140. The inner tube portion 160 connects the object-end portion 130 and the image-end portion 140, wherein the inner tube portion 160 is closer to the central axis of the plastic barrel 120 than the outer tube portion 150. The inner tube portion 160 includes the parallel inner surfaces 161 and the inclined inner surfaces 162, wherein the parallel inner surfaces 161 are parallel to the central axis, and each of the inclined inner surfaces 162 has the angle with the central axis. The reflection reduction area 170 is disposed on the one of the inclined inner surfaces 162 closest to the image-end opening 141, wherein the reflection reduction area 170 and the plastic barrel 120 are integrally formed by the injection molding method. The other details of the optical lens module 100 have been described in the is foregoing paragraphs and will not be repeated herein.

The IR-cut filter 1100 is disposed out of the plastic barrel 120. The image sensor 1300 is disposed on an image surface 1200 of the optical lens module 100, and the IR-cut filter 1100 is disposed between the plastic barrel 120 and the image sensor 1300.

In FIG. 8, the non-imaging light Li would be reflected from the object-side surface 1101 of the IR-cut filter 1100 to the reflection reduction area 170 of the plastic barrel 120, and would be reflected from the reflection reduction area 170 of the plastic barrel 120 to the object-side surface 117 of the lens element 116 as the non-imaging light Lo, wherein the non-imaging light Lo is attenuated much from the non-imaging light Li, so that the strength of the non-imaging light Lo is much less than the strength of the non-imaging light Li, and the ghost image on the image surface 1200 of the imaging apparatus 1000 has been decreased.

Figure 1:
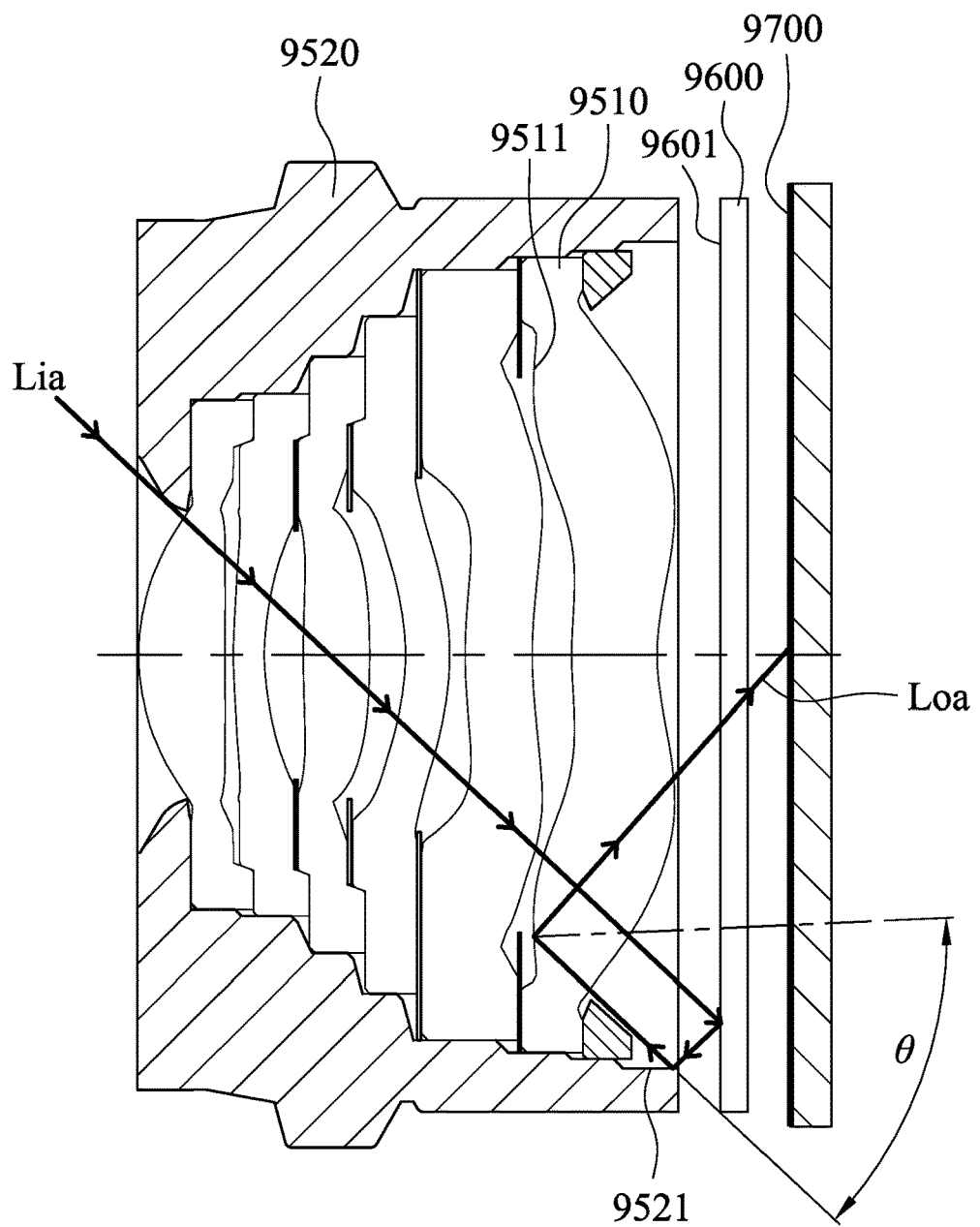
FIG. 1 is a schematic view of a conventional imaging apparatus.

Comparing with FIG. 1 according to the conventional imaging apparatus 9000, the non-imaging light Loa would be reflected from the inner wall 9521 of the plastic barrel 9520 to the object-side surface 9511 of the lens element 9510, wherein the non-imaging light Loa is attenuated little from the non-imaging light Lia, so that the strength of the non-imaging light Loa is still approach to the strength of the non-imaging light Lia, and it results in the ghost image on the image surface 9700 of the conventional imaging apparatus 9000.

Therefore, according to the 7th embodiment of the present disclosure, it is favorable for reducing the ghost image resulted from the non-imaging light totally reflected from the lens element to the image surface 1200 and improving the image quality by the reflection reduction area 170 disposed close to the image-end opening 141, so that the imaging apparatus 1000 can be applied to is the high-end portable electronic devices with camera functionalities.

8th Embodiment

Figure 9:
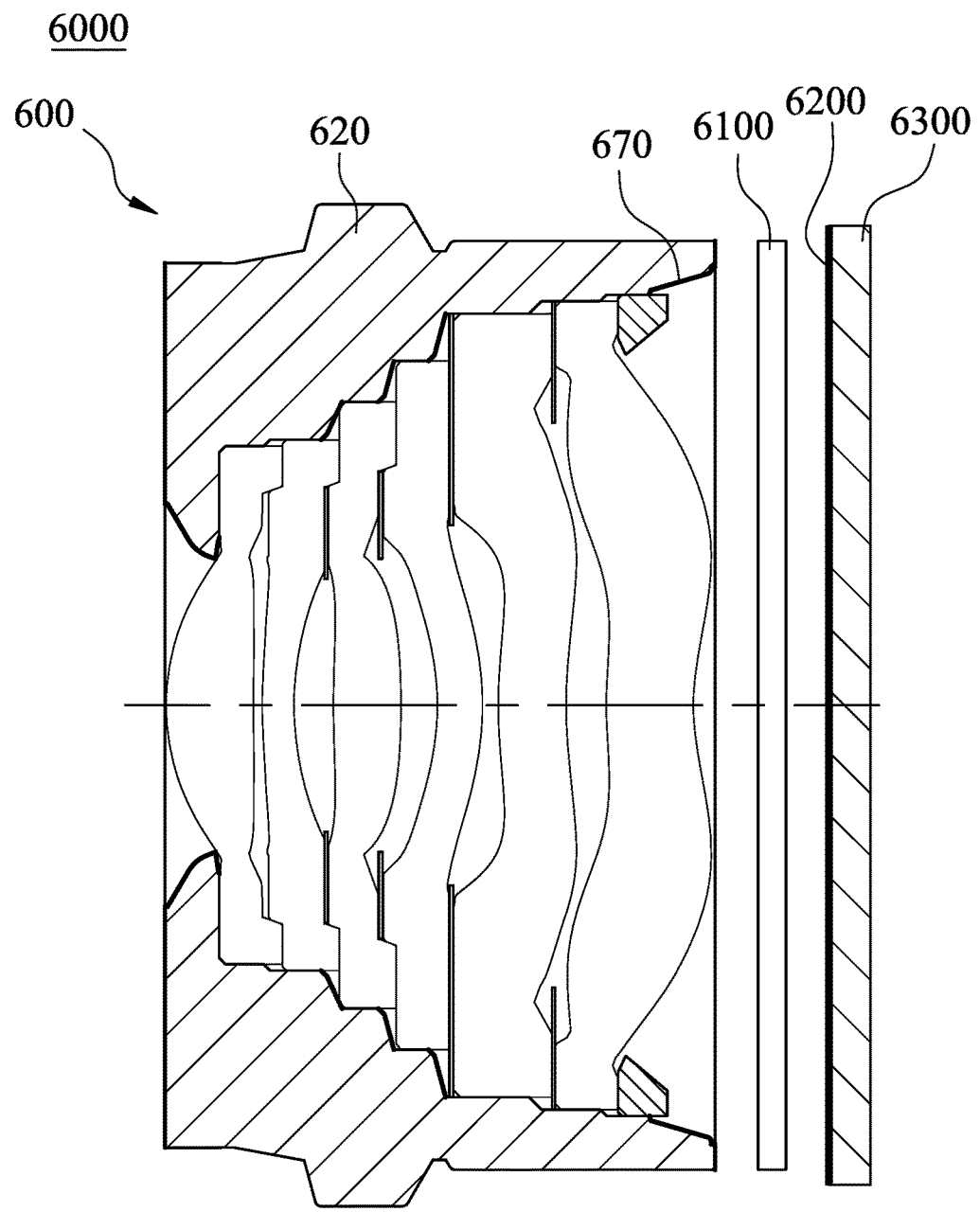
FIG. 9 shows an imaging apparatus according to the 8th embodiment of the present disclosure.

FIG. 9 shows an imaging apparatus 6000 according to the 8th embodiment of the present disclosure. In the 8th embodiment, an imaging apparatus 6000 includes the optical lens module 600 according to the 6th embodiment of the present disclosure, an IR-cut filter 6100 and an image sensor 6300.

In FIG. 7A, the optical lens module 600 includes the lens assembly 610, the plastic barrel 620 and the annular retaining member 680, The lens assembly 610 includes the lens elements (611-616) and is disposed in the plastic barrel 620. The plastic barrel 620 includes the object-end portion 630, the image-end portion 640, the outer tube portion 650, the inner tube portion 660 and at least three reflection reduction areas 670. The object-end portion 630 includes the object-end surface 631 and the object-end hole 632. The image-end portion 640 includes the image-end opening 641. The outer tube portion 650 connects the object-end portion 630 and the image-end portion 640. The inner tube portion 660 connects the object-end portion 630 and the image-end portion 640, wherein the inner tube portion 660 is closer to the central axis of the plastic barrel 620 than the outer tube portion 650. The inner tube portion 660 includes the parallel inner surfaces 661 and the inclined inner surfaces 662, wherein the parallel inner surfaces 661 are parallel to the central axis, and each of the inclined inner surfaces 662 has the angle with the central axis. The reflection reduction areas 670 are disposed on the inclined inner surfaces 662, especially the one of the inclined inner surfaces 662 closest to the image-end opening 641, the object-end portion 630 and the image-end portion 640, wherein the reflection reduction areas 670 and the plastic barrel 620 are integrally formed by an injection molding method. Therefore, it is favorable for obtaining the low reflection of the reflection reduction areas 670 and the superior yield rate of the injection molding method, so that the imaging apparatus 6000 can be applied to the high-end portable electronic devices with camera functionalities. The other details of the optical lens module 600 have been described in the foregoing paragraphs and will not be repeated herein.

The IR-cut filter 6100 is disposed out of the plastic barrel 620. The image sensor 6300 is disposed on an image surface 6200 of the optical lens module 600, and the IR-cut filter 6100 is disposed between the plastic barrel 620 and the image sensor 6300.

9th Embodiment

Figure 10:
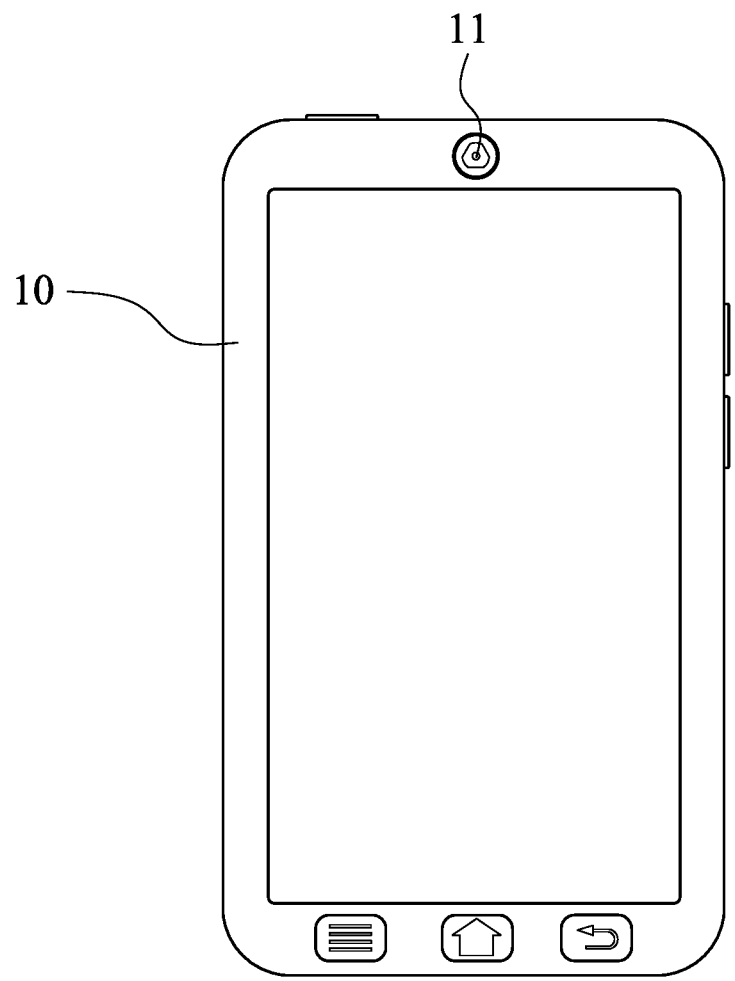
FIG. 10 shows an electronic device according to the 9th embodiment of the present disclosure.

FIG. 10 shows an electronic device 10 according to the 9th embodiment of the present disclosure. The electronic device 10 of the 9th embodiment is a smart phone, wherein the electronic device 10 includes an imaging apparatus 11, and the imaging apparatus 11 includes an optical lens module (not shown) according to the present disclosure. Therefore, it is favorable for reducing the ghost image resulted from the non-imaging light totally reflected from the lens element to the image surface and improving the image quality. Preferably, the electronic device 10 can further include but not limited to a display, a control unit, a storage unit, a random access memory unit (RAM), a read-only memory unit (ROM) or a combination thereof.

10th Embodiment

Figure 11:
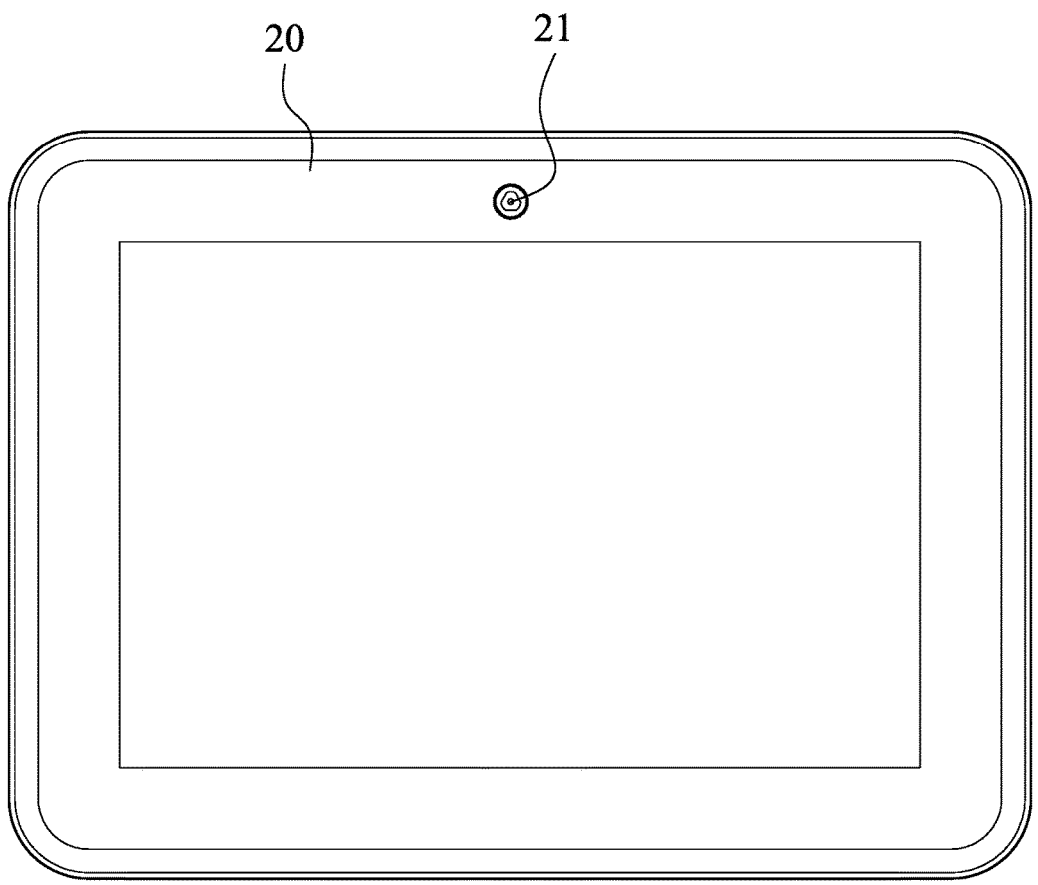
FIG. 11 shows an electronic device according to the 10th embodiment of the present disclosure.

FIG. 11 shows an electronic device 20 according to the 10th embodiment of the present disclosure. The electronic device 20 of the 10th embodiment is a tablet personal computer, wherein the electronic device 20 includes an imaging apparatus 21, and the imaging apparatus 21 includes an optical lens module (not shown) according to the present disclosure.

11th Embodiment

Figure 12:
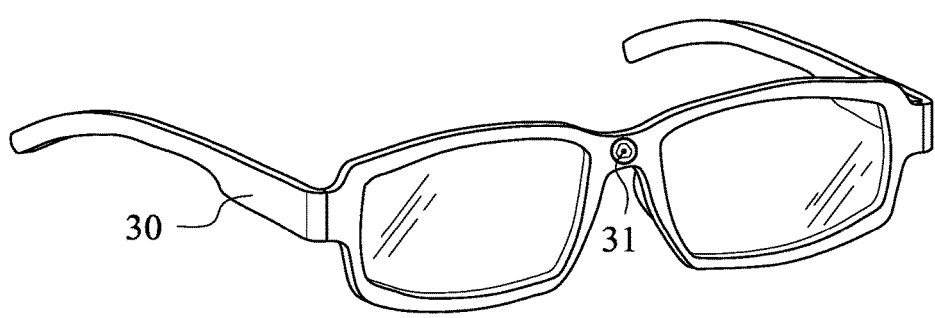
FIG. 12 shows an electronic device according to the 11th embodiment of the present disclosure.

FIG. 12 shows an electronic device 30 according to the 11th embodiment of the present disclosure. The electronic device 30 of the 11th embodiment is a head-mounted display, wherein the electronic device 30 includes an imaging apparatus 31, and the imaging apparatus 31 includes an optical lens module (not shown) according to the present disclosure.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An optical lens module, comprising:
a lens assembly comprising a plurality of lens elements; and
a plastic barrel, wherein the lens assembly is disposed in the plastic barrel, and the plastic barrel comprises:
an object-end portion comprising an object-end surface and an object-end hole;
an image-end portion comprising an image-end opening;
an outer tube portion connecting the object-end portion and the image-end portion;
an inner tube portion connecting the object-end portion and the image-end portion, wherein the inner tube portion is closer to a central axis of the plastic barrel than the outer tube portion is to the central axis and comprises:
a plurality of parallel inner surfaces parallel to the central axis; and
a plurality of inclined inner surfaces, wherein each of the inclined inner surfaces has an angle with the central axis; and
at least one reflection reduction area disposed on at least one of one of the inclined inner surfaces closest to the image-end opening and one of the parallel inner surfaces closest to the image-end opening, wherein the reflection reduction area and the plastic barrel are integrally formed by an injection molding method.

2. The optical lens module of claim 1, wherein an angle between the one of the inclined inner surfaces closest to the image-end opening and the central axis is α, and the following condition is satisfied:

$$1.0 \text{ degrees} < \alpha < 25.0 \text{ degrees}.$$

3. The optical lens module of claim 2, wherein the angle between the one of the inclined inner surfaces closest to the image-end opening and the central axis is α, and the following condition is satisfied:

$$2.0 \text{ degrees} < \alpha < 20.0 \text{ degrees}.$$

4. The optical lens module of claim 1, wherein at least three of the lens elements are connected to the parallel inner surfaces.

5. The optical lens module of claim 1, wherein a number of the parallel inner surfaces is at least six.

6. The optical lens module of claim 1, wherein a number of the reflection reduction area is at least three, and the three reflection reduction areas are disposed on the one of the inclined inner surfaces closest to the image-end opening, the object-end portion and the image-end portion, respectively.

7. The optical lens module of claim 1, wherein the reflection reduction areas are formed by sand-blasting indirectly.

8. The optical lens module of claim 1, further comprising:
an annular retaining member for disposing the lens assembly in the plastic barrel.

9. The optical lens module of claim 8, wherein at least one of the parallel inner surfaces is connected to the annular retaining member.

10. The optical lens module of claim 1, wherein a surface roughness of the reflection reduction area is Ra, and the following condition is satisfied:

$$0.18 \text{ μm} < Ra < 3.5 \text{ μm}.$$

11. The optical lens module of claim 1, wherein the plastic barrel is made of polycarbonate material.

12. The optical lens module of claim 11, wherein a refractive index of one of the lens elements closest to the image-end opening is n, and the following condition is satisfied:

$$1.45 < n < 1.62.$$

13. The optical lens module of claim 1, wherein an outer diameter of one of the lens elements closest to the image-end opening is Φ, and the following condition is satisfied:

$$5.85 \text{ mm} < \Phi < 9.5 \text{ mm}.$$

14. An imaging apparatus, comprising:
the optical lens module of claim 1;

an IR-cut filter (infrared-cut filter) disposed out of the plastic barrel; and an image sensor, wherein the image sensor is disposed on an image surface of the optical lens module, and the IR-cut filter is disposed between the plastic barrel and the image sensor.

15. An electronic device, comprising:

the imaging apparatus of claim 14.

\* \* \* \* \*